(12) United States Patent  
Maiorana

(10) Patent No.: US 9,365,147 B2
(45) Date of Patent: Jun. 14, 2016

(54) RENDERING TRAILER WITH DUMP BOX HAVING A CENTER GATE

(71) Applicant: Mac Trailer Manufacturing, Inc., Alliance, OH (US)

(72) Inventor: James A. Maiorana, Hartville, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 325 days.

(21) Appl. No.: 14/188,936

(22) Filed: Feb. 25, 2014

(65) Prior Publication Data

US 2014/0167485 A1 Jun. 19, 2014

Related U.S. Application Data

(63) Continuation of application No. 13/571,824, filed on Aug. 10, 2012, now Pat. No. 8,696,822, which is a continuation of application No. 12/943,975, filed on Nov. 11, 2010, now Pat. No. 8,333,434.

(51) Int. Cl.
*B08B 3/04* (2006.01)
*B60P 1/28* (2006.01)
*B60P 1/26* (2006.01)
*B60P 3/05* (2006.01)

(52) U.S. Cl.
CPC ... *B60P 1/28* (2013.01); *B60P 1/26* (2013.01); *B60P 3/05* (2013.01)

(58) Field of Classification Search
None
See application file for complete search history.

(56) References Cited

U.S. PATENT DOCUMENTS

| | | | |
|---|---|---|---|
| 1,820,910 | A | 9/1931 | Ham |
| 2,310,633 | A | 9/1943 | Heimburger |
| 2,516,527 | A | 7/1950 | Oltz |
| 3,348,337 | A | 10/1967 | Grasso |
| 3,552,659 | A | 1/1971 | Meyer |
| 4,092,044 | A | 5/1978 | Hoffman |
| 4,366,977 | A | 1/1983 | Davis et al. |
| 4,886,404 | A | 12/1989 | Jensen et al. |
| 5,435,627 | A | 7/1995 | Fleming |
| 5,599,071 | A | 2/1997 | Kann et al. |
| 5,769,501 | A | 6/1998 | Kann et al. |
| 5,829,842 | A | 11/1998 | Lombardo |
| 7,195,435 | B2 | 3/2007 | Clark |

*Primary Examiner* — Eric Golightly
(74) *Attorney, Agent, or Firm* — Sand & Sebolt

(57) ABSTRACT

A trailer comprising: a trailer body defining an interior chamber and having left and right side walls; a rear gate mounted adjacent a rear end of the trailer body; an inner gate which divides the interior chamber into a forward and rearward compartments; a perforated panel which has a plurality of holes formed therein, which is mounted along one of the left and right side walls adjacent a lower end of the one of the left and right side walls and which is adapted to allow fluids to drain through the holes; a doorway which is formed in the inner gate, which communicates with the forward and rearward compartments and which is adapted to allow a person to walk through the doorway; and a rigid door which is mounted on the inner gate and which is movable between open and closed positions for opening and closing the doorway.

20 Claims, 9 Drawing Sheets

RENDERING TRAILER WITH DUMP BOX HAVING A CENTER GATE

CROSS REFERENCE TO RELATED APPLICATION

This application is a continuation of U.S. patent application Ser. No. 13/571,824, filed Aug. 10, 2012 (now U.S. Pat. No. 8,696,822), which is a continuation of U.S. patent application Ser. No. 12/943,975, filed Nov. 11, 2010 (now U.S. Pat. No. 8,333,434); the disclosures of which are incorporated herein by reference.

BACKGROUND OF THE INVENTION

1. Technical Field

The present invention relates generally to vehicles such as trailers configured to be towed by a towing vehicle. More particularly, the present invention relates to a trailer having a dumping box which can be tilted to dump the contents of the box. Specifically, the present invention relates to a rendering trailer having a center gate with a door to facilitate cleaning the trailer.

2. Background Information

Amongst the many types of trailers used for hauling goods and various items along the highways and various other roadways are trailers known as rendering trailers. Rendering trailers are typically used to haul the carcasses, offal, heads, feet, skins, feathers or the like of dead animals and typically include open top containers or boxes which are tiltable to dump the carcasses or the like therefrom. These containers or boxes include a rear gate which is openable in order to allow carcasses or other contents to be dumped from the rear end of the trailer. In addition, these trailers often include an inner gate or center gate which is typically positioned within the container adjacent its center to divide the container into front and rear compartments. Thus, for instance, the carcasses of certain types of animals may be contained within the front compartment while the carcasses of other types of animals may be contained in the rear compartment so that the different types may be kept separate from one another so that the different types of carcasses may be dumped from the trailer in different locations. Another common scenario is the hauling of feathers (such as chicken feathers) in the front compartment and the hauling of the offal of the same chickens in the rear compartment for subsequent dumping at different locations. Those skilled in the art will recognize other scenarios. More particularly, the center gate is also openable and closable such that the center gate remains closed while the rear gate opens during dumping in order to dump only the carcasses or other load of the rear compartment. The trailer may subsequently be moved to another location at which the center gate and the rear gate are both opened in order to allow the dumping of the carcasses or other load from the front compartment.

After the contents of the trailer have been dumped from both compartments, the inside of the trailer is nonetheless rather messy with blood, offal and the like. Thus, the inside of the container requires regular cleaning. However, the center gate is a hindrance to cleaning the inside of the trailer because it impedes the ability of a worker to move between the front and rear compartments. Typically, the worker climbs over the center gate, typically using rungs which are permanently secured to the front and back sides of the center gate. This climbing procedure can be difficult, dangerous and also quite messy as a result of the nature of the load hauled in such trailers. Thus, there is a need in the art to facilitate the ability of a worker to move from the front to the rear compartment to allow the worker to more easily wash out both compartments.

SUMMARY

In one aspect, the invention may provide a trailer comprising: a trailer body defining an interior chamber and having left and right side walls; a rear gate mounted adjacent a rear end of the trailer body; an inner gate which substantially divides the interior chamber into a forward compartment and a rearward compartment; a first perforated panel which has a plurality of holes formed therein, which is mounted along one of the left and right side walls adjacent a lower end of the one of the left and right side walls and which is adapted to allow water and other fluids to drain through the holes; a doorway which is formed in the inner gate, which communicates with the forward and rearward compartments and which is adapted to allow a person to walk through the doorway; and a rigid door which is mounted on the inner gate and which is movable between open and closed positions for opening and closing the doorway.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
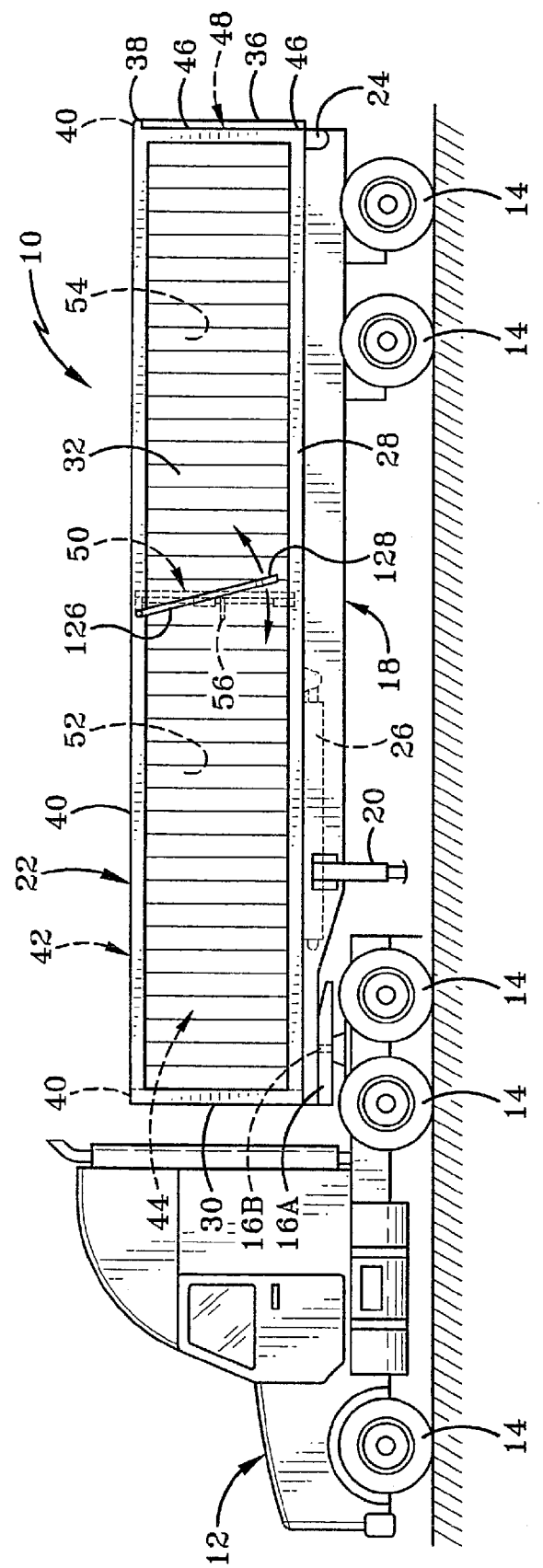
FIG. 1 is a side elevational view of the trailer connected to a towing vehicle.

The rendering trailer of the present invention is shown generally at 10 in FIG. 1 with its front end connected to a towing vehicle 12 shown as a tractor of a tractor trailer rig. Towing vehicle 12 is a motor vehicle having front and rear sets of road engaging wheels 14 and a hitch member 16A which releasably mates with a hitch member 16B of trailer 10 adjacent the front end of trailer in order to hitch the trailer to the towing vehicle. Trailer 10 includes a rigid frame 18 which extends substantially the full length of the trailer, sets of road engaging wheels 14 generally adjacent the rear of the trailer rotatably mounted on frame 18 and extending downwardly therefrom, and landing gear 20 secured to frame 18 generally adjacent its front end in order to support trailer 10 on the ground when unhitched from towing vehicle 12. Frame 18 is typically formed primarily of metal such as steel, aluminum or suitable metal alloys. Trailer 10 also includes a body or dump box 22 which is pivotally connected to frame 18 at a pivot 24 adjacent the rear end of the frame and box such that box 22 is pivotable about a horizontal axis extending from the left to the right side of the trailer between a lowered traveling or home position illustrated in FIG. 1 and a raised or tilted dumping position shown in FIG. 6. Trailer 10 further includes a lift 26 which may include one or more actuators, typically hydraulically operated, for raising and lowering the front of box 22 such that the front of box 22 pivots about pivot 24. Lift 26 is typically below, forward of box 22 or mounted on either side of box 22 generally toward the front thereof. Lift 26 in the exemplary embodiment includes a hydraulic piston-cylinder combination which is pivotally attached at one end to the bottom of box 22 and pivotally attached at its other end to frame 18. Although the present invention is described herein as a trailer which is towed by and thus pivots relative to a towing vehicle, dump box 22 may also be mounted on the frame of a motorized vehicle such as a straight truck, such that the frame on which the dump box is mounted is the same as the frame on which the vehicle engine and cab are mounted, and thus does not pivot relative to the engine and cab.

Dump box 22 is typically in the form of an open top container which is typically formed primarily of aluminum or an aluminum alloy or other suitable metal. Box 22 has a front and back defining therebetween a longitudinal direction of the box and trailer, and left and right sides defining therebetween an axial direction of the box and the trailer. Box 22 includes a substantially horizontal rigid bottom wall 28 having an upwardly facing horizontal top surface 29, a rigid front wall 30 which is rigidly secured to and extends upwardly from bottom wall 28 along the front of box 22, and left and right side walls 32 and 34 which are rigidly secured to the left and right sides of bottom wall 28 and extend upwardly therefrom and which are rigidly secured to the left and right sides of front wall 30 and extend rearwardly therefrom. In the exemplary embodiment, a series of perforated panels 33 are hingedly mounted via hinges 35 along left and right side walls 32 and 34 adjacent their lower ends such that each panel of 33 angles downwardly and inwardly from the lower portion of the given side wall to bottom wall 28 generally adjacent the respective side wall. In the exemplary embodiment, drain valves (not shown) are located below the perforated panels and spaced along the length of the trailer whereby the drain valves may be opened to allow water and other fluids to drain from within the trailer and closed to prevent such drainage. The perforated panels 33 thus allow water and other fluids to drain through the holes of the panels such that the water and fluids may subsequently drain through these drain valves.

Figure 6:
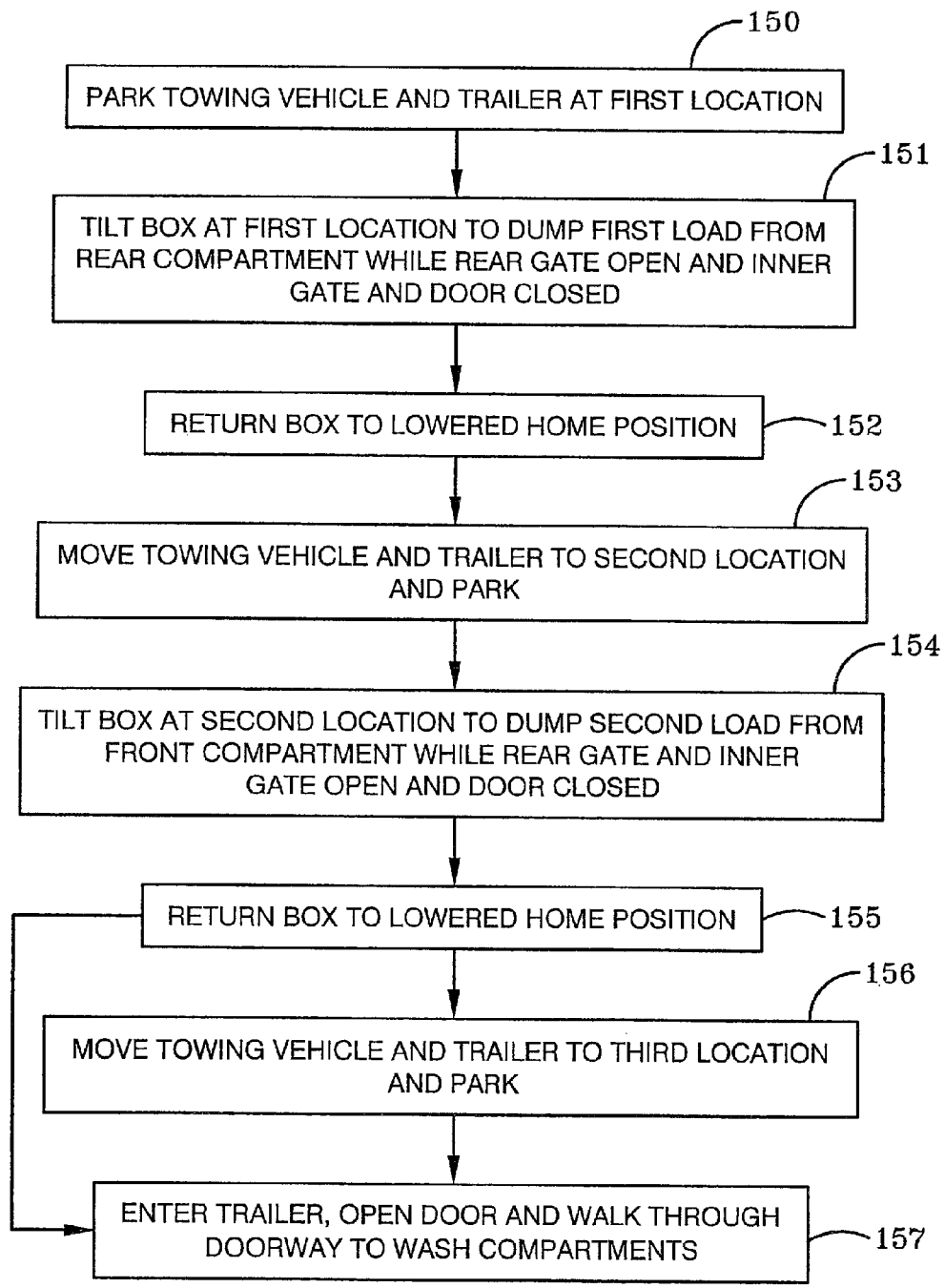
FIG. 6 is a flow chart showing the basic process of the invention.

Box 22 also includes a rigid rear gate 36 which is pivotally mounted adjacent its upper end to left and right side walls 32 and 34 at a pivot 38 whereby rear gate 36 is pivotable about an axially extending horizontal axis of pivot 38 between a closed position shown in FIG. 1 and an open position shown in FIG. 6. Rear gate 36 is typically formed of metal such as aluminum, steel or other suitable metal or alloy. Rear gate 36 serves as the rear or back wall of box 22 in the closed position. The rear gate and trailer include a securing mechanism to releasably secure the rear gate to the trailer body in the closed position. Each of front wall 30, side walls 32 and 34 and rear gate 36 has a respective top edge 40 such that the top edges together define a top entrance opening 42 of an interior chamber 44 of box 22 which is defined by bottom wall 28, front wall 30, side walls 32 and 34 and rear gate 36. Bottom wall 28 and side walls 32 and 34 have respective rear or back ends 46 which define a rear gateway or exit opening 48 of interior chamber 44 through which the contents of the trailer exit or are dumped when the trailer is tilted and rear gate 36 is open. Gate 36 thus substantially or completely covers rear gateway 48 in the closed position.

Trailer 10 further includes an inner gate 50 which is often referred to as a center gate in that it is typically generally centered or midway between the front and back of box 22 although this may vary. Inner gate 50 is a rigid structure typically formed of a metal such as aluminum, aluminum alloy or other suitable metal. Inner gate 50 extends from adjacent the top or top edges 40 of box 22 to adjacent upper surface 29 of bottom wall 28 and from adjacent the inner surface of left side wall 32 to adjacent the inner surface of right side wall 34 so that gate 50 serves as a divider which substantially divides interior chamber 44 into a front or forward compartment 52 and a rear or rearward compartment 54. Gate 50 thus defines the back of front compartment 52 and the front of rear compartment 54. A pair of rigid triangular stops 56 are (typically by welding) rigidly and permanently secured to and extend inwardly respectively from left and right side walls 32 and 34 directly across from one another adjacent the rearmost portion of front compartment 52. More particularly, the left stop 56 extends inwardly to the right from a vertical right or inner surface 58 of left side wall 32, and the other stop 56 extends inwardly to the left from a vertical left or inner surface 60 of right side wall 34 so that the stops extend toward one another.

Figure 2:
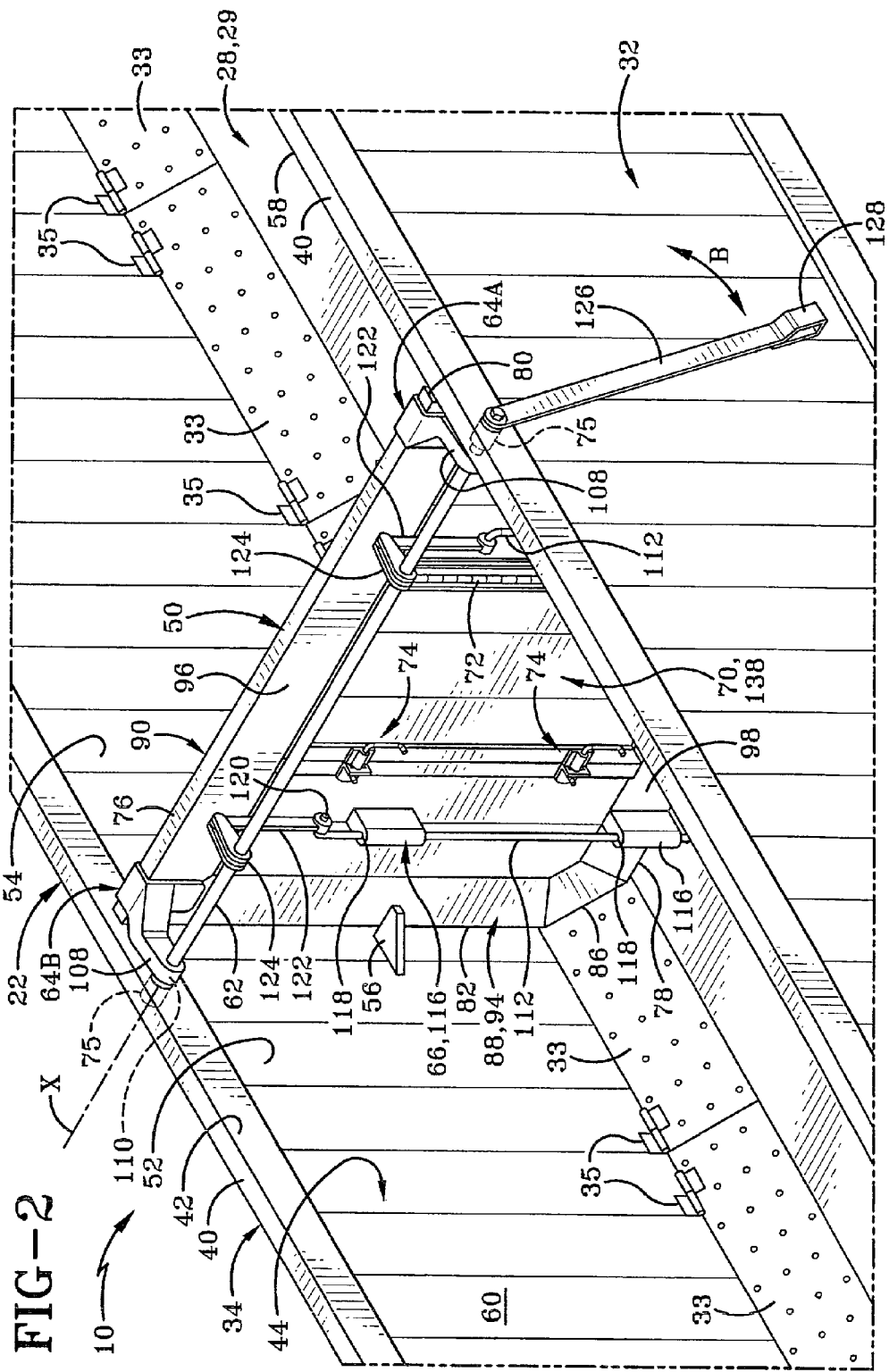
FIG. 2 is a perspective view of the inner gate and portions of the open top container with the inner gate in the closed position and the inner gate door in the closed position.
Figure 3:
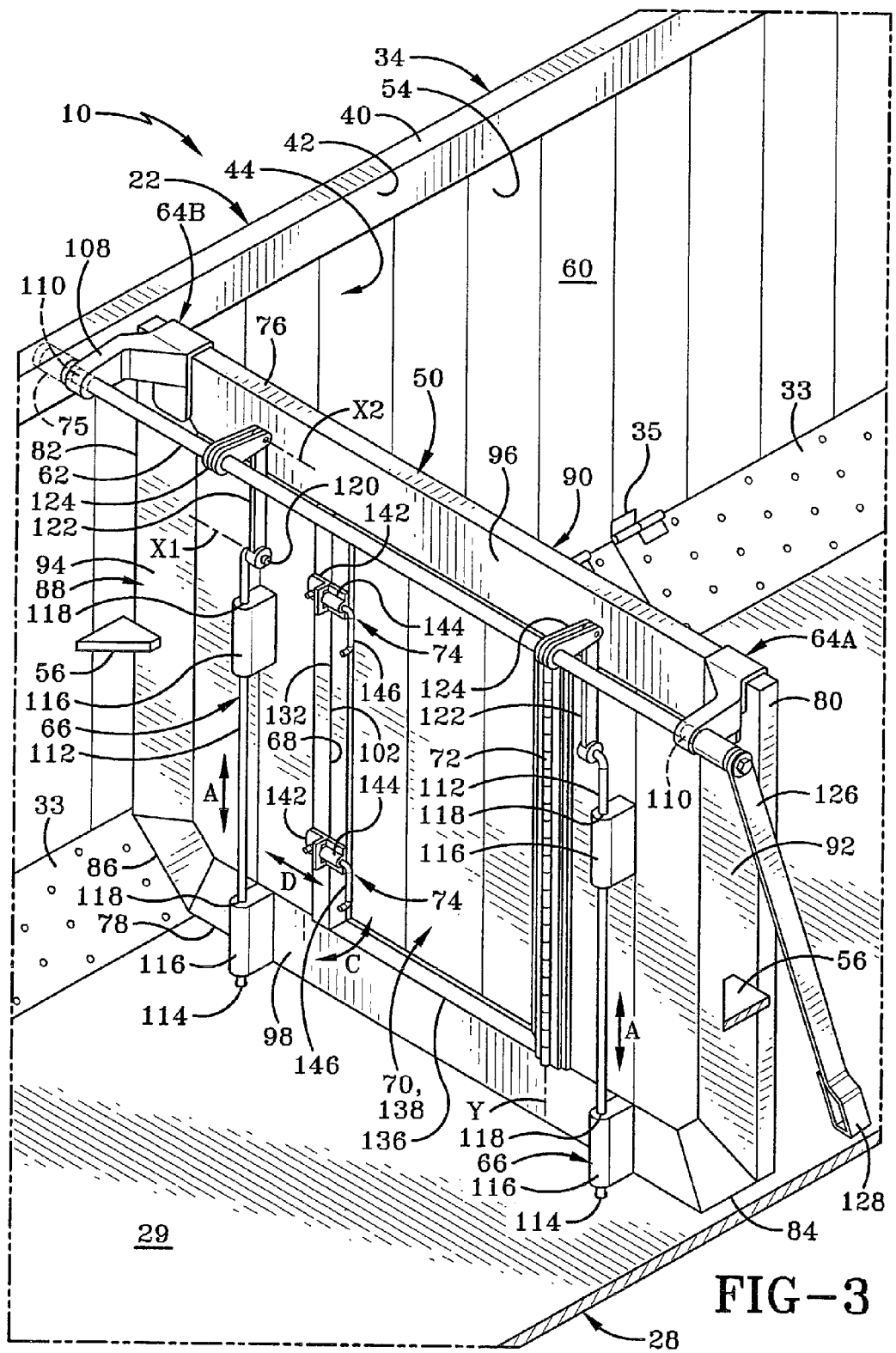
FIG. 3 is a perspective view similar to FIG. 2 with the left sidewall removed.
Figure 4:
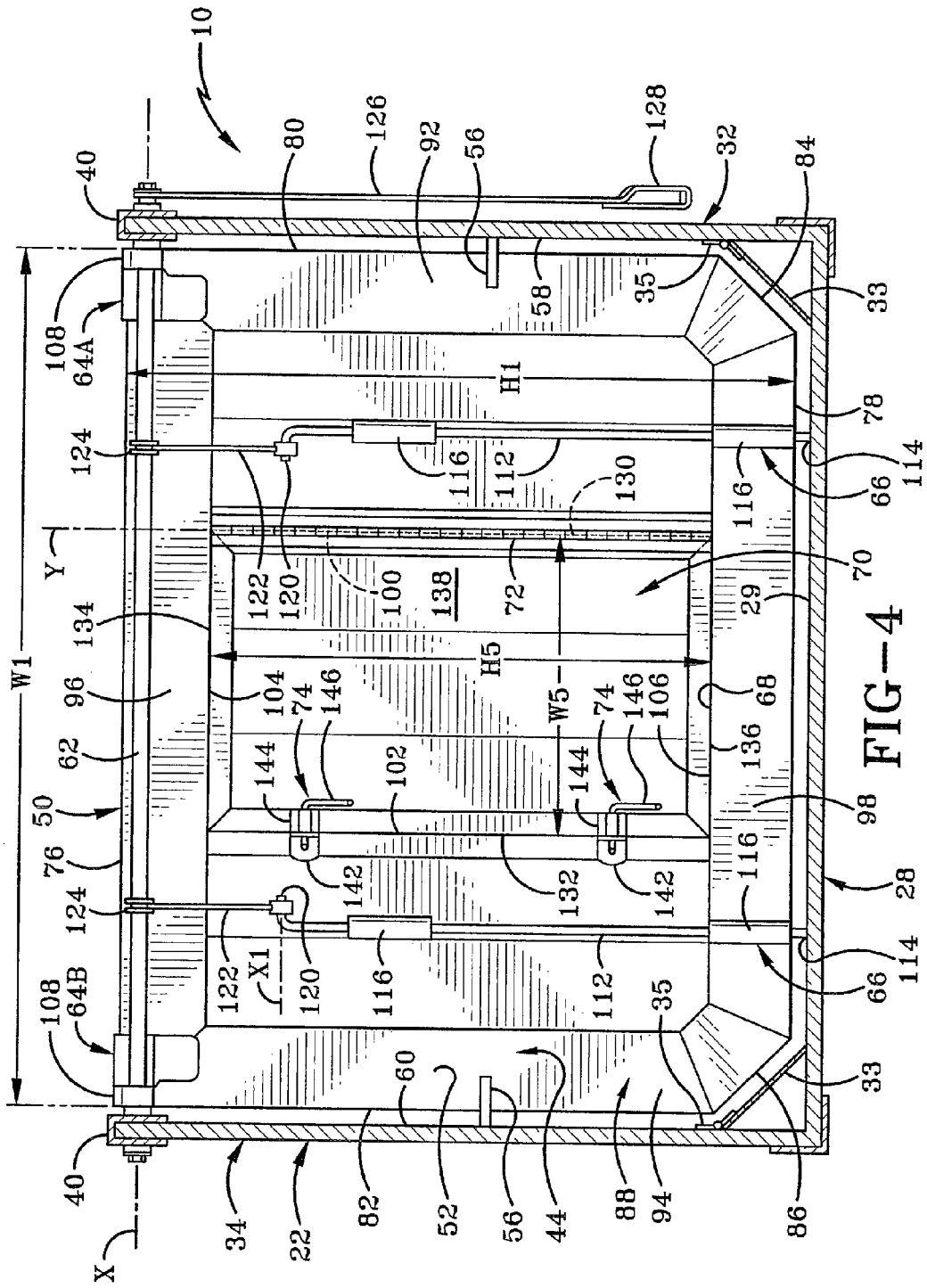
FIG. 4 is a front elevational view of the inner gate assembly with the dump box shown in section.
Figure 5:
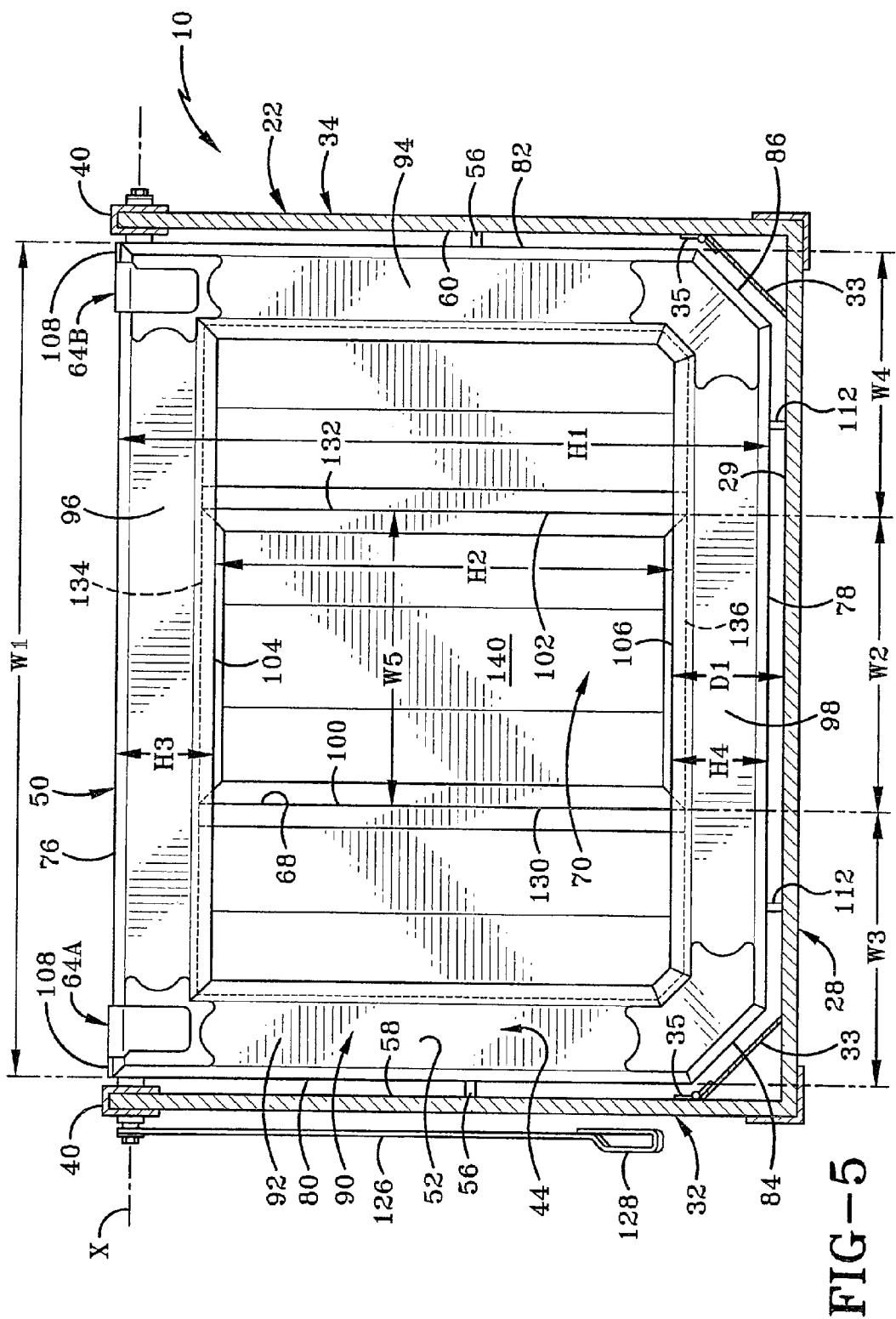
FIG. 5 is a rear elevational view of the inner gate assembly with the dump box shown in section.

Gate 50 is part of a center or inner gate assembly which includes a horizontal pivot or axle 62, left and right mounting brackets 64A and 64B, a gate securing mechanism 66, a through opening or rectangular doorway 68 formed through gate 50, a vertical flat rectangular door 70 pivotally mounted on gate 50 to rotate about a vertical axis Y (FIG. 4) of a vertical hinge 72, and a door securing mechanism which includes upper and lower door latches 74. Axle 62 is an axially elongated rigid structure which is typically formed of metal and extends between and is pivotally mounted on left and right side walls 32 and 34 respectively adjacent and below the respective top edges 40 thereof to rotate about an axially extending horizontal axis X (FIGS. 2, 4). More particularly, each of left and right side walls 32 and 34 define there through respective through holes 75 adjacent top edges 40 wherein each hole 75 extends from the left to the right and receives a portion of axle 62 there through adjacent the opposed left and right ends thereof to provide the rotatable mounting of axle 62 relative to walls 32 and 34.

Gate 50 has top and bottom horizontal axially elongated edges 76 and 78, vertical left and right side edges 80 and 82 which extend respectively downwardly from the left and right ends of top edge 76 to adjacent bottom edge 78, and bottom left and right beveled corner edges 84 and 86 wherein left corner edge 84 extends from the left end of bottom edge 78 upwardly and outwardly to the bottom of left side edge 80, and right corner edge 86 extends upwardly and outwardly from the right end of bottom edge 78 to the bottom end of right side edge 82. Edges 76-86 thus define the outer perimeter of gate 50. Bottom edge 78 is adjacent and spaced upwardly from top surface 29 of bottom wall 28. Similarly, left side edge 80 is adjacent and spaced inwardly to the right of inner surface 58 of left side wall 32, and right side edge 82 is adjacent and spaced inwardly from inner surface 60 of right side wall 34. Thus, no portion of gate 50 is in contact with box 22 whereby gate 50 may easily swing between its open and close positions. Gate 50 includes a substantially flat and vertical forward-facing front side 88 and a substantially flat and vertical rearward-facing back side 90 defining therebetween the thickness of the door in the longitudinal direction which is typically on the order of about 1 to 3 inches. Top and bottom edges 76 and 78 define therebetween a vertical height H1 which is typically generally similar to the height defined between top surface 29 of bottom wall 28 and top edges 40 although height H1 is typically 1 or 2 inches less than the height of interior chamber 44. In the exemplary embodiment, height H1 is about 64 inches and typically within the range of about 5 to 6 feet although this will vary depending on the height of interior chamber 44. Left and right side edges 80 and 82 define therebetween a horizontal axially extending width W1 of gate 50 which is somewhat less than the horizontal axial width of interior chamber 44 as defined between the inner surfaces 58 and 60 of the respective left and right side walls 32 and 34. Width W1 is typically somewhere in the range of about 2 to 8 inches less than the width of interior chamber 44 although this may vary somewhat. In the exemplary embodiment, width W1 is typically on the order of about 7 feet and typically within the range of about 6½ to 7½ feet although this may vary somewhat, especially depending on the width of interior chamber 44.

Gate 50 includes left and right generally flat vertical panels 92 and 94 each of which extend from top edge 76 to bottom edge 78, a top generally flat vertical panel 96 which extends between and is rigidly secured to the top portions of left and right panels 92 and 94, and a bottom generally flat vertical panel 98 which is rigidly secured to and extends between the bottom portions of left and right panels 92 and 94. Left panel 92 has a right or inner vertical edge 100; right panel 94 has a left or inner vertical edge 102; top panel 96 has a downwardly facing horizontal bottom edge 104; and bottom panel 98 has an upwardly facing horizontal bottom edge 106. Edges 100, 102, 104 and 106 thus form an inner perimeter which defines the rectangular doorway 68, which extends from front side 88 to back side 90.

Vertical edges 100 and 102 define therebetween a horizontal axial width W2 which is roughly about ⅓ width W1 and generally is greater than ¼ width W1 and less than ½ width W1. In the exemplary embodiment, width W2 is about 29 to 30 inches and typically is within the range of about 24, 26 or 28 inches to about 32, 34 or 36 inches. Edges 104 and 106 define therebetween a vertical height H2 of doorway 68 which in the exemplary embodiment is about 45 inches and about 7/10 of height H1. However, height H2 may vary depending on the height of gate 50 and other circumstances and is typically at least 36 inches. Height H2 needs to be suitable to allow a person to pass through doorway 68 although the person walking through doorway 68 may have to bend over or stoop to do so.

Edges 80 and 100 define therebetween a horizontal axial width W3 of left panel 92 which in the exemplary embodiment is roughly ⅓ width W1, and generally greater than ¼ width W1 and less than ½ width W1. In the exemplary embodiment, width W3 is about the same as width W2 and somewhat smaller, although it may be somewhat larger than width W2 as well. Width W3 typically falls within about the same range as given above for width W2. Edges 82 and 102 define therebetween a horizontal axially extending width W4 of panel 94 which is about the same as width W3, and thus typically falls within about the same range. Width W3 and width W4 may, however, be larger or smaller depending in part on the width of interior chamber 44. Edges 76 and 104 define therebetween a vertical height H3 which in the exemplary embodiment is about 9 to 10 inches and is typically within the range of about 6, 7 or 8 inches to about 11, 13 or 15 inches although this may vary depending on the specific circumstances. Edges 106 and 78 define therebetween a height H4 of bottom panel 98 which is typically about the same as height H3 and thus typically falls within the same ranges. Edge 106 is spaced upwardly from bottom wall 28 so that edge 106 and top surface 29 of bottom wall 28 define therebetween a height or vertical distance D1 which is the sum of height H4 and the distance between bottom edge 78 and top surface 29. Distance D1 is in the exemplary embodiment about 10 inches to about 11, 12 or 13 inches and typically within the range of about 7 inches to about 18 inches. In any case, edge 106 is spaced upwardly from top surface 29 so that a person must lift their feet upwardly and over edge 106 in order to walk through doorway 68.

Mounting brackets 64 are rigid structures typically formed of a metal or metal alloy such as aluminum or steel. Left and right brackets 64A and 64B are respectively rigidly secured to gate 50 adjacent the top left corner thereof and the top right corner thereof by bolts or other suitable means. Each bracket 64 includes an arm 108 which extends forward from gate 50 and has a cylindrical through hole 110 formed therethrough adjacent a front terminal end of arm 108. Each through hole 110 extends from the left side to the right side of arm 108 and receives therethrough a portion of axle 62 adjacent the respective end of the axle so that gate 50 via brackets 64 is pivotally mounted on axle 62 such that gate 50 and brackets 64 are rotatable or pivotable about axis X relative to axle 62 and box 22.

Gate securing mechanism 66 includes a rigid vertical rod 112 which is typically formed of metal and is vertically slidable (arrows A) so that the lower ends of rods 112 are insertable into and removable from respective holes 114 formed in bottom wall 28. When the lower ends of rods 112 are inserted into holes 114, rods 112 engage bottom wall 28 and securing mechanism 66 is in a secured position whereas when the lower ends of rods 112 are removed from holes 114, rods 112 are disengaged from bottom wall 28 and mechanism 66 is in an unsecured position. The left rod 112 is slidably mounted on a left set of upper and lower guide members 116 which are rigidly secured to gate 50 and extend forward therefrom. The upper and lower guide members 116 of the left set are vertically spaced from one another and define respective vertical through holes 118 wherein the upper hole 118 is vertically aligned directly above the lower hole 118. The left rod 112 is thus slidably received for vertical sliding movement within the corresponding upper and lower holes 118 of the left guide members 116. Similarly, the right rod 112 is slidably received within corresponding through holes 118 formed in a right set of upper and lower guide members 116 which are rigid structures and secured and arranged in the same manner as guide members 116 of the left set. Each rod 112 is bent at the upper end thereof to form a horizontal rod segment 120. Gate-securing mechanism 66 further includes a drive mechanism or drive chain which includes a rigid link 122 extending upwardly from rod segment 120, a rigid short arm 124 which extends forward from link 122 to axle 62, axle 62, a rigid lever arm 126, and a rigid handle 128. Each of segment 120, arm 124, link 122, arm 126 and handle 128 are typically formed of metal.

Each link 122 is pivotally connected at its lower end to the corresponding rod segment 120 to pivot about a horizontal axially extending axis X1 which passes through segment 120 and is parallel to axis X. Each link 122 adjacent its upper end is pivotally connected to the respective arm 124 adjacent its rear end to pivot about a horizontal axially extending axis X2 which is parallel to axes X and X1. Each arm 124 adjacent its front end is rigidly secured to axle 62 such that each arm 124 extends radially outwardly and rearwardly from axle 62 and is rotatable with axle 62 about axis X. Lever arm 126 adjacent its upper end is rigidly secured to axle 62 adjacent its left end and extends radially outwardly and downwardly therefrom to a rigid connection with handle 128 at its lower end. Thus, lever arm 126, handle 128, axle 62 and arms 124 are all rotatable together as a unit about axis X. A manual force applied to handle 128 in one direction thus causes rotation of lever arm 126, axle 62 and arms 124 about axis X to lower links 122 and rods 112 to slide downwardly into holes 114 to the secured position, while a manual force applied to handle 128 in the opposite direction causes lever arm 126, axle 62 and arms 124 to rotate about axis X in the opposite direction to raise links 122 and rods 112 out of holes 114. The rotation of handle 128 and the associated components is shown at arrows B in FIG. 2.

Door 70 is a rigid structure typically formed of a metal such as aluminum, steel or another suitable metal or alloy. Door 70 has vertical left and right side edges 130 and 132 defining therebetween a horizontal width W5, and horizontal top and bottom edges 134 and 136 defining therebetween a vertical height H5. Width W5 is approximately the same as and typically slightly smaller than width W2 so that door 70 fits within doorway 68 and substantially covers doorway 68 in the closed position so that a person cannot pass through doorway 68. In the exemplary embodiment, door 70 completely or nearly completely covers doorway 68 in the closed position. The difference between width W5 and width W2 is typically about ½ to 2 inches. Similarly, the difference between height H5 and height H2 is typically about ½ to 2 inches. In the exemplary embodiment, height H5 is less than height H2 to allow door 70 to be easily moved into and out of doorway 68. Door 70 has a substantially flat vertical front side 138 which is typically generally flush with front side 88 of gate 50 in the closed position. Similarly, door 70 has a substantially flat vertical back side 140 which is also generally flush with back side 90 of gate 50 in the closed position.

Each door latch 74 includes a rigid first mounting bracket 142 which is rigidly secured to gate 50 adjacent doorway 68 opposite hinge 72, a rigid second mounting bracket 144 which is rigidly secured to door 70 adjacent the corresponding bracket 142, and a rigid latch member 146 which is movably mounted on bracket 144 to move between a secured or latched position in which latch member 146 engages bracket 142 and an unsecured position in which latch member 146 is disengaged from bracket 142. Door 70 may be pivotally moved via hinge 72 between its open and closed positions when latch members 146 are in their unsecured position. When door 70 is in its closed position and latched via latch members 146 in their secured position, door 70 is secured and cannot move from the closed position to the open position. In the exemplary embodiment, bracket 142 defines a vertically elongated slot through which a portion of latch member 146 moves between the secured and unsecured positions. More particularly, latch member 146 is rotatable (arrow C) about an axial horizontal axis between a first position in which latch member 146 can slide back and forth (arrow D) horizontally to the left and right to respectively insert or remove latch member 146 from engagement with bracket 142 via the elongated slot. Any suitable securing mechanism may be used to release or secure door 70 in the closed position.

Figure 7:
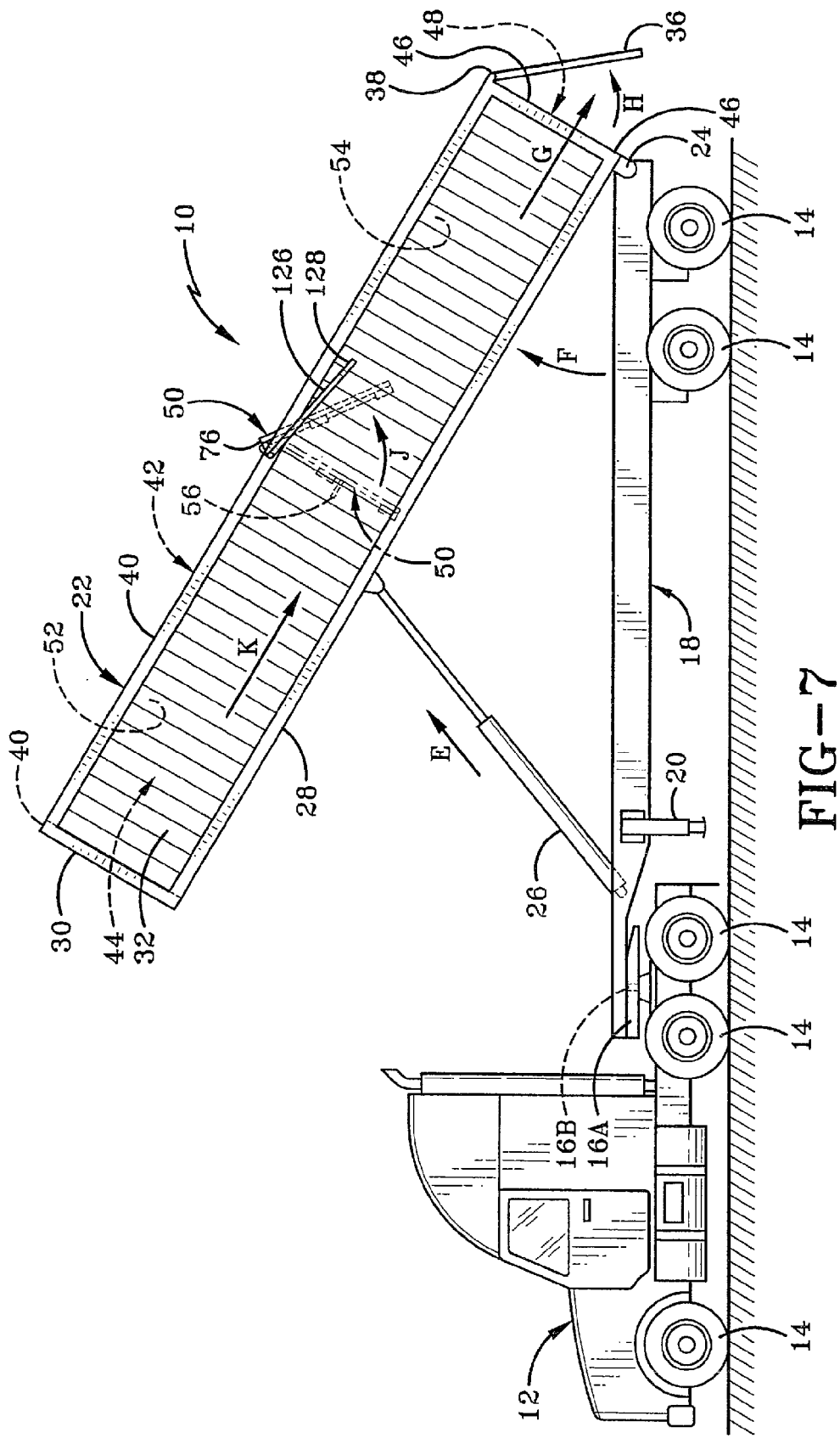
FIG. 7 is a side elevational view showing the dumping box tilted and the operation of the rear gate and inner gate for purposes of dumping the contents of the box.
Figure 7A:
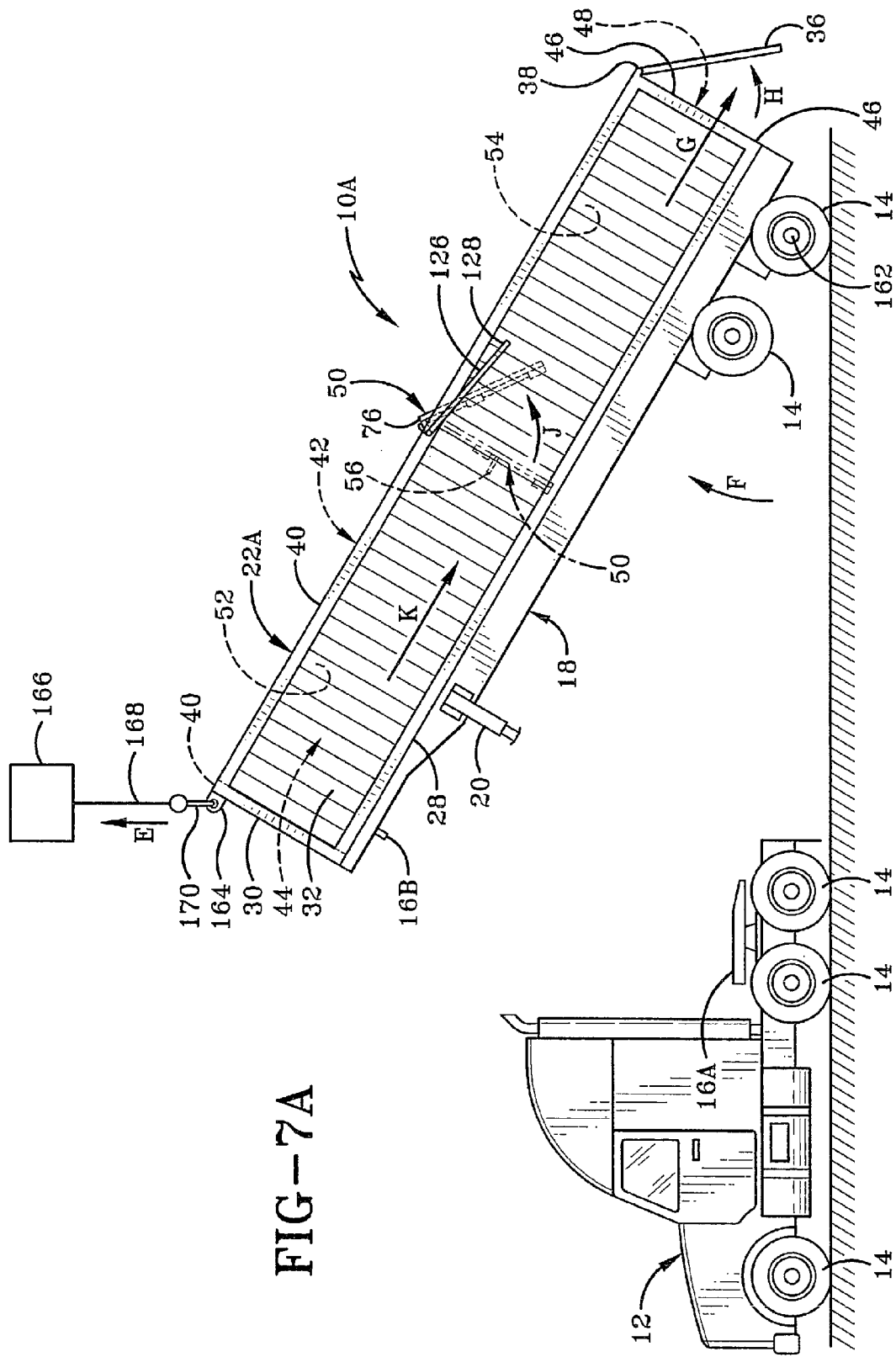
FIG. 7A is a side elevational view similar to FIG. 7 showing the dumping box of an alternate embodiment tilted and the operation of the rear and inner gates as in FIG. 7.

Before describing the method of the present invention, an alternate rendering trailer 10A is first briefly described with reference to FIG. 7A. Trailer 10A is similar to trailer 10 and includes all the previously described components except that trailer 10A includes a dump box 22A which, unlike dump box 22, is rigidly secured to frame 18 and therefore does not pivot relative to frame 18. Dump box 22A thus does not include the pivot 24 of dump box 22, but may include a lift or hook connection 164 adjacent the front end of the dump box to facilitate the front end being lifted by a separate lift such as a crane 166 having a cable 168 and a hook 170 which may be secured to hook connection 164. Although trailer 10A does not include rear pivot 24, the entire trailer 10A may be pivoted about a rearmost axle 162 of the rearmost wheels 14 of the trailer.

The overall method of using trailer 10 and the use of door 70 for cleaning out the trailer is now described. The basic steps of the method are shown in FIG. 6 at blocks 150-157. Typically, the driver will drive towing vehicle 12 with trailer 10 attached thereto to a first location where he or she will park the towing vehicle and trailer (block 150). At this location, the securing mechanism which secures rear gate 36 in the closed position is released such that gate 36 is able to swing about pivot 38 to its open position. Then, lift 26 or 166 is actuated (arrows E in FIGS. 7, 7A) to raise the front end of box 22, 22A pivotally about pivot 24 or 162 (arrow F) to tilt box 22, 22A to dump a first load (arrow G) of animal carcasses or the like from rear compartment 54 through rear gateway 48, which is uncovered due to rear gate 36 swinging (arrow H) to its open position about pivot 38 as a result of the tilting of box 22. It is noted that the first load may be of contents other than animal carcasses, such as discussed in the Background section of the present invention. As shown in FIG. 7, the front end of box 22 is tilted relative to frame 18 while hitch members 16A and 16B remain connected to one another whereas FIG. 7A illustrates that the hitch member 16B is disconnected and separated from hitch member 16A such that the front end of frame 18 and dump box 22A is pivoted about axle or pivot 162 relative to tractor 12. The tilting of box 22, 22A to dump the first load occurs while inner gate 50 and door 70 are in the closed positions (block 151). Thus, the trailer has a first dumping configuration in which box 22, 22A is tilted and rear gate 36 is open while inner gate 36 is closed and secured and door 70 is closed and secured. The first load of animal carcasses or other contents is typically of a certain type, or may be of two or more different types of animals. Because inner gate 50 and door 70 are closed and secured during the tilting of box 22, 22A, the second load of animal carcasses or other contents within front compartment 52 are retained therein by gate 50 and door 70, which block the rearward movement thereof from compartment 52 into compartment 54. After the first load has been dumped at the first location, box 22, 22A is returned (opposite arrow F) to its lowered home position (block 152 and FIG. 1) by operating lift 26, 166 (opposite arrow E) to lower the front end of box 22, 22A pivotally about pivot 24, 166. During the lowering of the front end of box 22, 22A, rear gate 36 naturally swings back (opposite arrow H) to its closed position to cover gateway 48, at which time the rear gate is secured in the closed position. Inner gate 50 and door 70 remain closed and secured during the step of lowering box 22, 22A to its home position, just as they were during the tilting of box 22, 22A. With box 22, 22A in its travel or home position and with gates 36 and 50 and door 70 closed and secured, the driver typically drives the towing vehicle and trailer 10 to a second location and parks at the second location (block 153).

At the second location, the securing mechanisms for rear gate 36 and inner gate 50 are released while the securing mechanism for door 70 remains secured such that gates 36 and 50 are able to swing (arrows J and H) to their open positions while door 70 remains in its closed position. In this configuration, lift 26 is again operated to tilt box 22, 22A at the second location to dump a second load (arrow K) of animal carcasses or other contents from front compartment 52 past open inner gate 50 into rear compartment 54 and out of interior chamber 44 through rear gateway 48. The tilting of box 22, 22A thus pivotally opens inner gate 50 and rear gate 36 to allow the second load to exit from front compartments 52 and 54 (block 154) as noted. The lower ends of gates 36 and 50 thus swing rearwardly relative to the trailer body from the closed position to the open position in response to the tilting of box 22, 22A. The second load typically is made up of animal carcasses or other animal parts of a given type or types which may be from the same or a different type of animal from those of the first load. The trailer thus has a second dumping configuration in which box 22, 22A is tilted, gates 36 and 50 are open and door 70 is closed and secured. Once the second load has been dumped, box 22, 22A is returned to the lowered home position (block 155) by operating lift 26, 166 to lower the front of box 22, 22A about pivot 24, 162. The return to the home position causes inner gate 50 and rear gate 36 to move to their closed positions, after which the operator will secure them with the respective securing mechanisms in the closed position. Stops 50 limit the forward swinging movement of inner gate 50 so that gate 50 cannot swing forward beyond the closed position.

Figure 8:
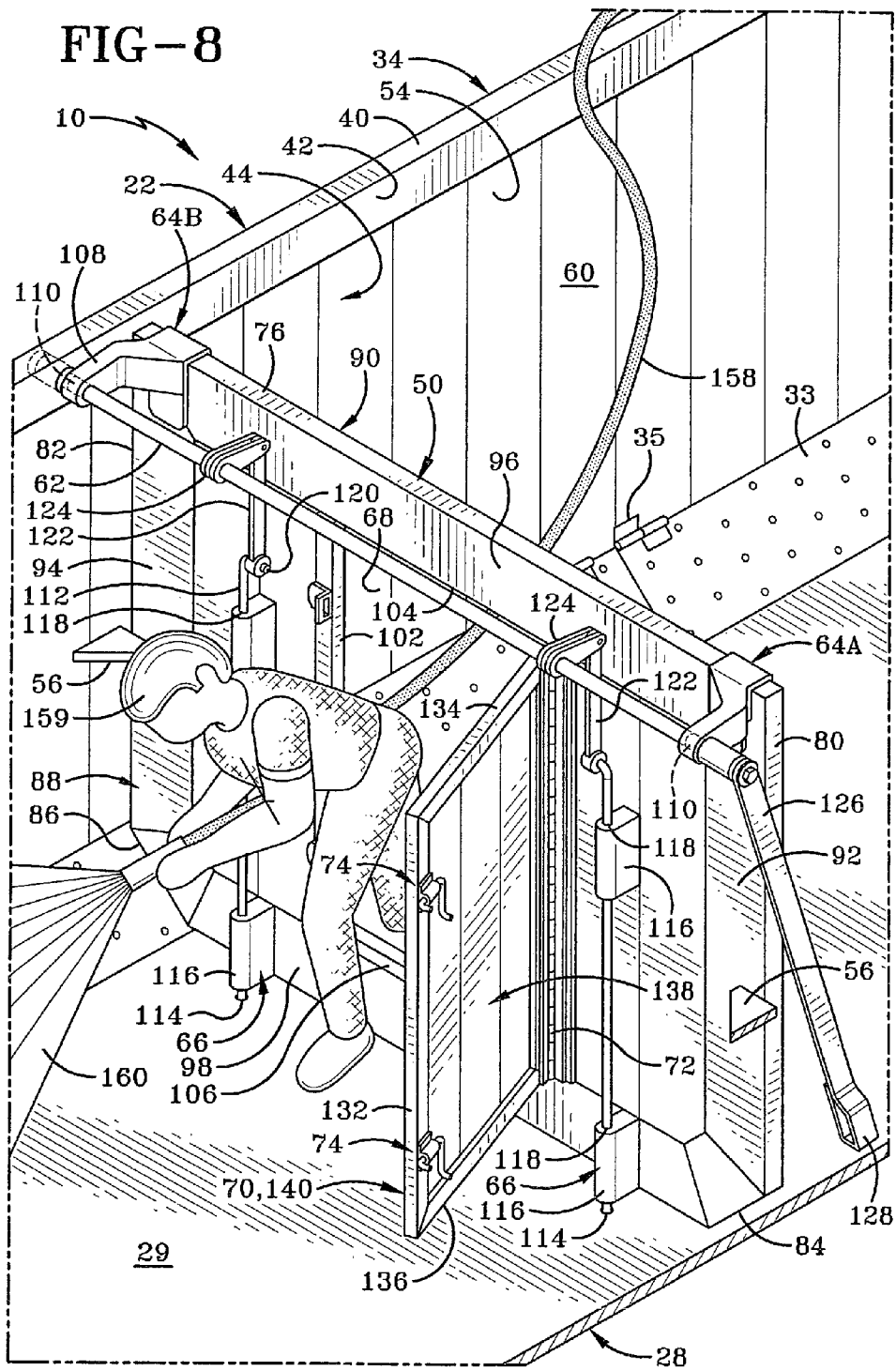
FIG. 8 is a perspective view similar to FIG. 3 showing the inner gate door in the open position and a worker walking through the inner gate doorway during the washing process.

The driver may then leave the towing vehicle and trailer parked at the second location or drive the towing vehicle and trailer to a third location (block 156) and park it for the purposes of washing box 22, 22A out. As noted at block 157 and shown in FIG. 8, a washing person 159 will bodily enter trailer 10 typically with a water hose 158 draped over the top edge of front wall 30, left side wall 32 or right side wall 34, open door 70, and walk through doorway 68 in order to wash the front and rear compartments 52 and 54 with water 160 sprayed from the hose. It is noted that water hose 158 may be a standard hose for spraying water therefrom at a pressure associated with water provided by a given municipality, or it may be, for example, a pressure washer hose such that water may be sprayed therefrom at relatively high pressures. More particularly, the worker will typically enter front compartment 52 such as by climbing on towing vehicle 12 or a ladder over front wall 30 or side walls 32 and 34. The worker may climb down or drop down into interior chamber 44. Once inside interior chamber 44, the worker will unlatch the securing mechanism 74 and open door 70 to uncover or provide access to doorway 68. The washing person then steps upwardly and over edge 106 of bottom panel 98 to walk through doorway 68 while pulling hose 158 through doorway 68 in order to wash out rear compartment 54, typically after washing out front compartment 52. Box 22 may be tilted somewhat in order to facilitate draining water and debris out of rear gateway 48. Although other cleaning equipment may be used, most typically the trailer is washed out simply with water which is fed from a suitable water source through hose 158 whereby the washing person may suitably control the water exiting hose 158 to wash the inside of the trailer therewith.

The present invention thus provides a rendering trailer with an inner gate having a doorway formed therein and a door mounted thereon which facilitates the ability of a person to move between the front and rear compartments of box 22, 22A, particularly for the purpose of washing the trailer body and gates. The use of the inner gate assembly thus makes washing the trailer out easier while also making it safer inasmuch as the washer does not have to climb over the inner gate assembly. As noted in the Background section of the present application, a standard center gate used with rendering trailers has secured to its front and back sides ladder rungs to facilitate the washing person climbing over the gate. The present invention thus eliminates the need for climbing over the center gate whereby gate 50 is free of such ladder rungs on the front side and back side thereof.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A trailer comprising:
   a trailer body defining an interior chamber and having left and right side walls;
   a rear gate mounted adjacent a rear end of the trailer body;
   an inner gate which substantially divides the interior chamber into a forward compartment and a rearward compartment;
   a first perforated panel which has a plurality of holes formed therein, which is mounted along one of the left and right side walls adjacent a lower end of the one of the left and right side walls and which is adapted to allow water and other fluids to drain through the holes;
   a doorway which is formed in the inner gate, which communicates with the forward and rearward compartments and which is adapted to allow a person to walk through the doorway; and
   a rigid door which is mounted on the inner gate and which is movable between open and closed positions for opening and closing the doorway.

2. The trailer of claim 1 wherein the trailer body has a bottom wall; and the first perforated panel angles downwardly and inwardly from the one of the left and right side walls to the bottom wall.

3. The trailer of claim 1 further comprising a hinge by which the first perforated panel is hingedly mounted along the one of the left and right side walls.

4. The trailer of claim 3 wherein the trailer body has a bottom wall; and the first perforated panel angles downwardly and inwardly from the one of the left and right side walls to the bottom wall.

5. The trailer of claim 1 further comprising a second perforated panel mounted along the one of the left and right side walls adjacent the lower end of the one of the left and right side walls to allow water and other fluids to drain through holes in the second perforated panel.

6. The trailer of claim 5 further comprising a first hinge by which the first perforated panel is hingedly mounted along the one of the left and right side walls; and a second hinge by which the second perforated panel is hingedly mounted along the one of the left and right side walls.

7. The trailer of claim 6 wherein the trailer body has a bottom wall; and each of the first and second perforated panel angles downwardly and inwardly from the one of the left and right side walls to the bottom wall.

8. The trailer of claim 5 wherein the trailer body has a bottom wall; and each of the first and second perforated panel angles downwardly and inwardly from the one of the left and right side walls to the bottom wall.

9. The trailer of claim 1 wherein the first perforated panel is mounted along the left side wall; and further comprising a second perforated panel which has a plurality of holes formed therein, which second perforated panel is mounted along the right side wall adjacent a lower end of the right side wall and which is adapted to allow water and other fluids to drain through the holes in the second perforated panel.

10. The trailer of claim 9 wherein the trailer body has a bottom wall; the first perforated panel angles downwardly and inwardly from the left side wall to the bottom wall; and the second perforated panel angles downwardly and inwardly from the right side wall to the bottom wall.

11. The trailer of claim 9 further comprising a first hinge by which the first perforated panel is hingedly mounted along the left side wall; and a second hinge by which the second perforated panel is hingedly mounted along the right side wall.

12. The trailer of claim 11 wherein the trailer body has a bottom wall; the first perforated panel angles downwardly and inwardly from the left side wall to the bottom wall; and the second perforated panel angles downwardly and inwardly from the right side wall to the bottom wall.

13. The trailer of claim 10 wherein the bottom wall has a top surface;
the left side wall has an inner surface;
the right side wall has an inner surface;
the inner gate has a horizontal top edge having left and right ends;
the inner gate has a horizontal bottom edge which has left and right ends and which is adjacent and spaced upwardly from the top surface of the bottom wall;
the inner gate has a vertical left side edge which has a bottom end, which extends downwardly from the left end of the top edge to adjacent the bottom edge, and which is adjacent and spaced inwardly of the inner surface of the left side wall;
the inner gate has a vertical right side edge which has a bottom end, which extends downwardly from the right end of the top edge to adjacent the bottom edge, and which is adjacent and spaced inwardly of the inner surface of the right side wall;
the inner gate has a bottom left beveled corner edge which extends from the left end of the bottom edge upwardly and outwardly to the bottom end of the left side edge; and
the inner gate has a bottom right beveled corner edge which extends from the right end of the bottom edge upwardly and outwardly to the bottom end of the right side edge.

14. The trailer of claim 9 wherein the trailer body has a first drain valve which is below the first panel and which may be opened to allow water and other fluids to drain through the first drain valve and closed to prevent drainage of the water and other fluids through the first drain valve; and the trailer body has a second drain valve which is below the second panel and which may be opened to allow water and other fluids to drain through the second drain valve and closed to prevent drainage of the water and other fluids through the second drain valve.

15. The trailer of claim 1 wherein the trailer body has a drain valve which is below the first panel and which may be opened to allow water and other fluids to drain through the drain valve and closed to prevent drainage of the water and other fluids through the drain valve.

16. The trailer of claim 1 wherein the inner gate is pivotable about a horizontal axis.

17. The trailer of claim 16 wherein the door is pivotable about a vertical axis.

18. The trailer of claim 16 wherein the rear gate is pivotable about a horizontal axis.

19. The trailer of claim 16 wherein the trailer body has a bottom wall having a top surface;
the left side wall has an inner surface;
the right side wall has an inner surface;
the inner gate has a bottom horizontal edge and vertical left and right side edges;
the bottom edge is adjacent and spaced upwardly from the top surface of the bottom wall, the left side edge is adjacent and spaced inwardly to the right of the inner surface of the left side wall, and the right side edge is adjacent and spaced inwardly from the inner surface of the right side wall so that no portion of the inner gate is in contact with the trailer body to facilitate the inner gate swinging between open and closed positions.

20. The trailer of claim 1 wherein the rear gate is pivotable about a horizontal axis.

* * * * *